United States Patent [19]

Mills

[11] 4,308,073
[45] Dec. 29, 1981

[54] PELLETS OF GRAPHITE AND CARBON BLACK AND METHOD OF PRODUCING

[75] Inventor: King L. Mills, Bartlesville, Okla.

[73] Assignee: Phillips Petroleum Company, Bartlesville, Okla.

[21] Appl. No.: 52,659

[22] Filed: Jun. 27, 1979

[51] Int. Cl.$^3$ .................... C09C 1/58; C09C 1/46; C01B 31/14
[52] U.S. Cl. .................... 106/307; 23/314; 264/117; 423/448; 423/445; 252/444; 75/48
[58] Field of Search .................... 106/307; 23/314; 264/117; 423/448; 252/444; 75/48

[56] References Cited

U.S. PATENT DOCUMENTS

| | | | |
|---|---|---|---|
| 2,639,225 | 5/1953 | Venuto | 23/314 |
| 2,997,744 | 8/1961 | Stoddard | 423/488 |
| 3,186,928 | 6/1965 | Keaton | 106/307 |
| 3,844,809 | 10/1974 | Murray | 106/307 |
| 4,102,967 | 7/1978 | Vanderveen | 264/117 |
| 4,194,901 | 3/1980 | Gambacorta | 75/48 |

FOREIGN PATENT DOCUMENTS

| | | | |
|---|---|---|---|
| 2004367 | 3/1969 | France | 106/307 |
| 49-42519 | 4/1974 | Japan | 106/307 |
| 1070627 | 6/1967 | United Kingdom | 75/48 |

OTHER PUBLICATIONS

Chemical Abstracts vol. 85, 1976 #85:268246.
The Encyclopedia of Chemical Process Equipment, Reinhold Pub. Corp., NY, pp. 625–627 (1964).

Primary Examiner—Brian E. Hearn

[57] ABSTRACT

Pellets comprising graphite and carbon black are made by mixing at least two weight percent carbon black with graphite, subsequently adding liquid pelleting medium, and pelletizing using available pelletizing methodology.

9 Claims, No Drawings

PELLETS OF GRAPHITE AND CARBON BLACK AND METHOD OF PRODUCING

The present invention relates to a method of producing pellets of graphite and carbon black. In another aspect, it relates to such pellets of graphite and carbon black.

Graphite or soft native carbon, a very common mineral, occurring naturally in black to dark gray foliated masses, with a metallic luster and greasy feel, is widely used for pencil leads, as a lubricant, for making crucibles and other refractories, carbonizing steel and for other industrial uses. Artificial graphite, for example, made from coke, may also be used.

Graphite is frequently provided in powdered form. For certain uses pelleted graphite offers significant practical advantages in ease of handling and reduction of graphite dust contamination. However, articles or pellets of graphite generally require a binder or special treatment and methods of making graphite articles where no binder is required may require complex treatment, for example, compression after pretreatment. See U.S. Pat. Nos. 3,404,061 and 3,475,244. Composite graphite articles or pellets have physical properties and characteristics determined in part by both the graphite and by the other components of the articles.

A drawback of the prior art composite articles is that the components of the article other than the graphite may impart undesirable non-graphitic properties to the ultimate product. Accordingly, an object of the instant invention is a method of pelletizing graphite using components that minimize or essentially eliminate imparting undesirable properties to the pelleted graphite. A further object of the instant invention is such pellets comprising graphite which primarily possess properties of graphite. Still another object of the invention is a method for pelletizing graphite employing currently available pelleting apparatus. Other objects and advantages of the instant invention will become apparent to persons skilled in the art from the following specification when considered in the light of the appended claims.

According to the invention graphite and carbon black are mixed together to form a first mixture which is subsequently mixed with liquid pelleting medium to form a second mixture. The second mixture is formed into wet pellets, and the wet pellets are dried.

Further, according to the invention composite pellets of graphite and carbon black are provided.

It has been discovered and it is upon this discovery that the instant invention is predicated that commercially sized pellets of graphite can be prepared by mixing flocculent carbon black with powdered graphite followed by pelletizing the mixture using almost any type of equipment used for pelleting carbon black.

The instant invention is not limited to graphite pellets having primarily the characteristics of graphite but extends to all pellets comprising both graphite and carbon black whether the carbon black is used alone or is used in conjunction with other materials used as a binder.

It has been found that use of conventional carbon black pelletizing methodology to pelletize graphite in the absence of carbon black either does not form pellets or forms pellets that are not commercially desirable or forms pellets only after relatively complex treatment sequences. Commercially desirable pellets, as used herein, are generally relatively small pellets having a relatively uniform size distribution and adequate hardness to withstand shipping and handling.

Commercially desirable pellet sizes vary according to the nature of the pellets and the use to which the pellets will be put by a particular user. For example, where the pelletized material is to be physically incorporated into another material such as into rubber, pellets in the range of 0.25 mm to 1 mm can be desirable. Where pellets of graphite are to be used in steel manufacture, for example, as for carbonization of steel or for use as a recarbonization ladle and furnace additive, commercially desirable pellets can be broadly in the range of 1 mm to 8 mm diameter, preferably in the range of 3 mm to 8 mm diameter, and more preferably in the range of 6 mm to 8 mm diameter. As hereinafter used in this specification, the phrase "commercially desirable pellet sizes" refers to pellets in these latter three ranges having a relatively uniform size distribution. However, it is not intended thereby to limit the instant invention which can be used to produce composite pellets of almost any desirable size range by methods familiar to those skilled in the art. As is known in the art of pelleting, pellets vary in size. Generally, pellets designated as having a designated size range, for example, 6 mm to 8 mm, are considered satisfactory if at least 50 percent of the pellets have diameters within that range.

Commercially desirable pellet sizes also vary according to the difficulty and expense of manufacture. Generally, smaller pellets are desirable because less water is required to pelletize and drying time and energy requirements are reduced.

Pellet hardness is another factor. Generally, the pellets must be hard enough to adequately withstand shipping and handling but soft enough to be readily dispersed for use. Average pellet hardness should be greater than about 20 grams force, and broadly between about 20 and about 200 grams force. As a practical matter, pellets with an average hardness above 200 grams force are seldom observed (See, however, Example VI below).

Another factor is size distribution. Generally, pellets having a narrow size distribution, that is, pellets the major amount of which have an overall diameter within a fairly narrow range of diameters, are more desirable than pellets having a broad range distribution of diameters because such narrow ranges increase predictability of results, simplify handling, and the like. Uniformity of pellet size is also important to reduce drying costs and time to produce uniformly dry pellets.

It has been found that addition of at least two percent by weight flocculent carbon black, for example, ASTM N330 loose dry flocculent carbon black, to graphite with dry mixing before water addition forms commercially desirable pea-sized and smaller pellets of greater uniformity in size distribution under conventional operating conditions of the pelleter.

The carbon black is believed to act as a binder to the graphite, coating the graphite particles and causing small pellets to form. However, the present invention is not limited by such a theory of formation but extends to all pellets comprising both graphite and carbon black and to the methods hereinafter described for making such pellets regardless of the mode of action by which such a mixture of graphite and carbon black forms such pellets.

About two weight percent (2%) flocculent carbon black, based on the weight of graphite, appears to be the lower limit usable to make relatively uniform and relatively smaller graphite pellets. There appears to be no upper limit to the amount of carbon black which may be admixed with graphite to form pellets since 100% carbon black will pellet. Moreover, as the amount of carbon black is increased above about 2 percent carbon black, it is expected that smaller more uniform pellets will be produced. Thus, in accordance with the present invention graphite pellets comprising at least about two weight percent (2%) carbon black per weight of graphite can be formed, provided however that each pellet comprises both carbon black and graphite. A pellet having predominantly graphitic character can be formed by using carbon black in the range of about 2 to about 50 percent based on the weight of graphite. Generally the pellets of the present invention will comprise from about 2 to about 10 weight percent carbon black. Particularly good results have been obtained employing from about 4 to about 6 weight percent carbon black to produce pellets the major amount of which is in the 6–8 mm diameter size range. It is noted that as used throughout the specification and claims the amount of carbon black expressed in weight percent is weight percent carbon black based on the weight of graphite.

As hereinafter described, the pelleting solution used in performing the instant invention comprises a pelleting liquid. However, the precise composition of the pelleting liquid is not considered critical to the instant invention and in addition to water any commercially available pelleting solution or additive known in the art and compatible with the instant invention as hereinafter described can be used. Such solutions include aqueous solutions of sodium, ammonium or calcium salts of lignin sulfonate, molasses, and the like.

The basic steps of the process of the instant invention consist of first mixing the graphite powder with a predetermined quantity of flocculent carbon black to produce a first mixture. A pelleting liquid is then mixed with said first mixture to form a second mixture and the resulting wet second mixture is agitated to form wet pellets. The pelleting can be carried out in any conventional pelleting apparatus such as elongated cylinders with rotating shafts having tines or pins on the shaft used, for example, for pelleting carbon black. The wet pellets are then dried in a dryer such as, for example, by contacting the wet pellets with a hot drying gas for example, hot flue gases and the like, to form dried pellets which are then removed from the dryer.

The quantity of pelleting liquid employed to form the wet second mixture generally depends on the type and particle size of the carbonaceous material but will be an amount effective to form pellets in a given pelleting apparatus. Generally the weight ratio of pelleting liquid to the combined weight of carbon black plus graphite will range from about 25:75 to about 40:60. Very good results were obtained employing the weight ratio in the range of about 30:70 to about 35:65 pelleting solution to carbon black and this ratio is preferred.

In addition to water, aqueous solutions of any commercially available pelleting solute or additive may be used as the pelleting liquid. Such additives include calcium lignin sulfonate, ammonium lignin sulfonate, sodium lignin sulfonate, molasses and the like. Preferably the amount of pelleting solute added will be in the range of about 0.5 to about 10 percent by weight of the pelleting liquid.

Any flocculent carbon black such as furnace black, thermal black, channel black, etc. can be used. Preferably a flocculent furnace carbon black is dry blended with powdered graphite prior to wet pelleting. Preferably at least 2 weight percent of flocculent carbon black is used. More preferably at least 4 to 6 weight percent of carbon black is used. There is no real upper limit to the amount of carbon black which may be used, since 100% carbon black will pellet, except as determined by the particular use to which the composite carbon black and graphite pellets will be put. Moreover, addition of larger amounts of carbon black are expected to produce smaller pellets having a more uniform size distribution.

For pellets having a substantial graphite character, preferably between 2 and 50 and more preferably between 5 and 50 weight percent of carbon black relative to graphite is used. For pellets to be used in steel manufacture, a currently preferred range to produce pellets in the 6-mm to 8-mm diameter size range is in the range of from about 2 to about 10 weight percent carbon black relative to graphite and more preferably from about 4 to 6 weight percent carbon black is used.

It has been found that carbon black requires more water or aqueous pelleting liquid in pelleting than does graphite. Consequently, as the amount of carbon black in the composite pellets is increased, the amount of liquid added will also generally be increased.

The instant invention is further illustrated by the following examples and data.

| Analysis of Graphic Used[1] | |
| --- | --- |
| Graphitic Free Carbon, wt. %., | 87 |
| Silicon Dioxide, wt. %., | 5 |
| Residual Oxide, wt. %., | 8 |
| Sulfur, wt. %., | 0.21 |
| Volatile Matter, wt. %., | 1.71 |
| CTAB, $M^2$/gm., | 16 |
| DBP, cc/100 gm., | 65 |
| $N_2SA$, $M^2$/gm., | 11 |
| Iodine Adsorption, mgm/gm., | 24 |
| U.S. Standard Sieve | |
| Held on 35 mesh, wt. %., | 1.8 |
| Held on 65 mesh, wt. %., | 20.6 |
| Held on 100 mesh, wt. %., | 16.2 |
| Held on 150 mesh, wt. %., | 16.6 |
| Held on 200 mesh, wt. %., | 14.2 |
| Held on 325 mesh, wt. %., | 14.0 |
| Held on the pan, wt. %., | 16.6 |
| Bulk Density, lbs/cu. ft., | 49.54 |
| Analysis of Carbon Black Used in the Examples Flocculent or Loose N330 Carbon Black | |
| | (ASTM) |
| $N_2SA$, $M^2$/gm, | 85 |
| CTAB $M^2$/gm, | 82 |
| $I_2No$, mg/gm, | 87 |
| 24M4DBP, cc/100 | 96 |
| Tint Strength, | 96 |
| Photelometer, | 71 |

[1]Sulfur and volatile matter weight percentages are not exclusive of other component categories and hence the total weight percent slightly exceeds 100%.

The test procedures used are set out in the following table:

| Characteristic | Test Procedure |
| --- | --- |
| $N_2SA$ | ASTM D 3037-76 |
| $I_2No.$ | ASTM D 1510-76 |
| 24M4DBP | ASTM D 3493-76 |
| DBP | ASTM D 2414-76 |
| Tint | ASTM D 3265-76 |
| Photelometer | ASTM D 1618-75 |
| CTAB | J. Janzen and G. Kraus, Rubber Chemistry and Technology 44: |

| Characteristic | Test Procedure |
|---|---|
| | 1287 (1971) (M²/gm) |

As required, detailed embodiments of the invention are disclosed herein; however, it is to be understood that the disclosed embodiments are merely exemplary of the invention which may be embodied in various forms. Therefore specific structural and functional details disclosed herein are not to be interpreted as limiting but merely as a basis for the claims and as a representative basis for teaching one skilled in the art to variously employ the present invention in any appropriate detailed structure.

In the following examples, pelleting was conducted in a batch type pin pelleter comprising an external shell constructed of a one-half section of 8-inch overall diameter pipe with vertical sidewalls attached thereto to form a U-shaped shell having a hinged top cover with an inlet for adding water and/or solutions. The overall height of the shell was 11⅝ inches, overall width 8⅜ inches, and the length was 23 inches. A rotatable shaft was rotatably mounted in the shell and attached to a variable speed drive motor capable of rotational speeds in the range of 100 to 640 rpm. The shaft was 1½ inches in diameter having a spiral pin arrangement, one inch between centers of adjacent pins, having an approximate pin diameter of ⅜-inch, with a 30° spacing around the shaft. The pin length is such that the peripheral tips have a close clearance of the lower portion of the U-shaped shell, that is, the pins are in adjacent spaced apart relationship with the well of the shell.

In each example, carbon black and graphite in proportions specified in the example were introduced into the pelleter via the hinged lid and dry mixed, i.e., mixed in the pelleter before adding a pelleting liquid. Pelleting fluid as specified in the respective examples was then added through the inlet in the hinged top cover and wet pelleting was conducted as therein set forth.

Although the Examples set out below were performed using the above-described pelleter, the precise pelleter is not considered critical to the invention. Any suitable pelleter and dryer such as those described for example in U.S. Pat. Nos. 3,674,437 or 3,102,005, respectively, may be used.

Pellet Size Distribution as shown below in the examples was determined using U.S. Standard sized mesh screens. Pellet Size Distribution in Examples II, V, and VII was determined according to a modified ASTM A1511-74 wherein a No. 5 mesh screen was added to a series of screens graduated between 10 mesh and 120 mesh (U.S. Standard).

Average crushing strength (pellet hardness) was determined using a commercial tester, for example, a Sweigart Pellet Hardness Tester, Model 5, range 0-250 grams-force, available from A. L. Sweigart Technical Service Shop, 1206 Hemlock Street, Borger, TX 79007. The results given in Table I represent the average force in grams required to crush a pellet based on testing of 20 pellets.

In considering the following actual examples, refer to tables in each example for specific ratios of carbon black to graphite, operating conditions, and the like.

EXAMPLE I

TABLE 1

| | |
|---|---|
| Graphite (lbs.) | 8 |
| N330 Carbon Black (lbs.) | 0 |
| Pelleting Liquid (lbs.) | 3.60 |
| Water (Wt. %) | 100 |
| Calcium Lignin Sulfonate (Wt. %) | 0 |
| Nyclinol (Wt. %) | 0 |
| Additional Water (lbs.) | 0 |

TABLE 2

| | Run 1 | Run 2 |
|---|---|---|
| Pelleter, RPM, | 450 | 100 |
| Pelleting Time, min. | 90 | 90 |
| (Pellets were dried at 150° C. to contain about 0.5 wt. % water) | | |
| Pellet Analysis, U.S. Standard Sieve, wt. percent on sieve or pan: | | |
| Greater than 10 Mesh, wt. %, | No pellets | 81.1 |
| Less than 10 Mesh, wt. % | formed. | 18.9 |
| Wt. % Carbon Black (Based on Graphite) | | 0 |

Run 1 was made at 450 RPM; then this same mass was run as Run 2 at 100 RPM. In Run 1, at 450 RPM, only "mud" was produced.

A large proportion of the pellets formed in Run 2 at 100 RPM were up to 25 mm. in diameter using only graphite. The pellets ranged in size from about one inch diameter balls down to unpelleted dust. That amount larger than 10 mesh was 81.1 weight percent; that smaller than 10 mesh was 18.9 weight percent. As indicated, a large proportion of the pellets were up to 25 mm. diameter and the pellets were non-uniform, having a wide distribution of sizes.

This example indicates that using water as the pelleting liquid without added carbon black or a standard pelleting aid is generally unsuccessful for forming graphite pellets. When pellets are formed, for example, by low speed operation, the pellets range up to 25 mm. diameter and are non-uniform in size distribution.

EXAMPLE II

TABLE 1

| | |
|---|---|
| Graphite (lbs.) | 8 |
| N330 Carbon Black (lbs.) | 0 |
| Pelleting Liquid (lbs.) | 3.52 |
| Water (Wt. %) | 97.24 |
| Calcium Lignin Sulfonate (Wt. %) | 2.76 |
| Nyclinol (Wt. %) | 0 |
| Additional Water (lbs.) | 0.44 |

TABLE 2

| | |
|---|---|
| Pelleter, RPM | 450 |
| Pelleting Time, min. | 30 |
| (Pellets were dried at 150° C. to contain about 0.5 wt. % water) | |
| Pellet Analysis, U.S. Standard Sieve, wt. percent on sieve or pan: | |
| Greater than 10 mesh, wt. %, | 90.4 |
| Less than 10 mesh, wt. %, | 9.6 |
| Held on #5, wt. % | 82.8 |
| Held on #10, wt. %, | 7.6 |
| Held on #12, wt. %, | 0.4 |
| Held on #14, wt. %, | 0.3 |
| Held on #18, wt. %, | 0.1 |
| Held on #35, wt. %, | 0.4 |
| Held on #60, wt. %, | 0.4 |
| Held on #120, wt. %, | 1.1 |
| Held on Pan, wt. %, | 6.9 |
| Average Hardness (force in grams) | 27 |

TABLE 2-continued

| | |
|---|---|
| Low Value (force in grams) | 8 |
| High Value (force in grams) | 68 |
| Wt. % Carbon Black (Based on Graphite) | 0 |

Until water was increased by 0.44 pounds to 3.96 pounds total, only "mud" formed. This example, like Example I, used no carbon black, but did use, as a conventional pelleting aid or additive, an aqueous solution of calcium lignin sulfonate (55 wt. % calcium lignin sulfonate, 45 wt. % water). The mass again tended to form "mud", but did form pellets when additional water was added. Pellets formed with the use of added water ranged in size from 3 mm. to 13 mm. in diameter. Most were the larger pellets. A broad distribution size of pellets was observed.

This example indicates that the use of a pelleting liquid containing a conventional pelleting aid or additive without added carbon black results in production of pellets having a relatively broad, non-uniform size distribution.

EXAMPLE III

TABLE 1

| | |
|---|---|
| Graphite (lbs.) | 8 |
| N330 Carbon Black (lbs.) | 0.16 |
| Pelleting Liquid (lbs.) | 3.80 |
| Water (wt. %) | 97.11 |
| Calcium Lignin Sulfonate (wt. %) | 2.89 |
| Nyclinol (wt. %) | 0 |
| Additional Water (lbs.) | 0 |

TABLE 2

| | |
|---|---|
| Pelleter, RPM, | 450 |
| Pelleting Time, min. | 85 |
| (Pellets were dried at 150° C. to contain about 0.5 wt. % water) | |
| Pellet Analysis, U.S. Standard Sieve, wt. percent on sieve or pan: | |
| Greater than 10 mesh, wt. %, | 56.6 |
| Less than 10 mesh, wt. % | 43.4 |
| Wt. % Carbon Black (Based on Graphite) | 2.0 |

Blending dry graphite with about 2 weight percent flocculent carbon black prior to wet pelleting using a pelleting liquid comprising water containing calcium lignin sulfonate, pellets were formed, but a considerable quantity of the pellets was large, ranging from about 13 mm. to 18 mm. in diameter. About 2 weight percent carbon black (based on the graphite) is about the lower limit usable to make graphite pellets.

This example indicates that the addition of at least about 2 percent by weight of flocculent carbon black to the graphite produces pellets which tend to be more uniform in size distribution than those produced using a pelleting liquid containing a pelleting aid or additive without carbon black.

TABLE 1

| | |
|---|---|
| Graphite (lbs.) | 8 |
| N330 Carbon Black (lbs.) | 0.4 |
| Pelleting Liquid (lbs.) | 3.56 |
| Water (wt. %) | 96.91 |
| Calcium Lignin Sulfonate (wt. %) | 3.09 |
| Nyclinol, wt. %, | 0 |
| Additional water (lbs.) | 0 |

TABLE 2

| | |
|---|---|
| Pelleter, RPM, | 450 |
| Pelleting Time, min., | 55 |
| (Pellets were dried at 150° C. to contain about 0.5 wt. % water) | |
| Pellet Analysis, U.S. Standard Sieve, wt. percent on sieve or pan: | |
| Greater than 10 mesh, wt. %, | 86.2 |
| Less than 10 mesh, wt. % | 13.8 |
| Wt. % Carbon Black (Based on Graphite) | 5.0 |

Blending dry graphite with about 5 weight percent flocculent carbon black prior to wet pelleting using water containing calcium lignin sulfonate, pellets were formed as "pea-size" pellets, the major amount ranging from 6 mm. to 8 mm. in diameter.

This example indicates that further increasing the proportion of carbon black added to the graphite further reduces the average size of the pellets and makes the size distribution more uniform. About 5 weight percent carbon black produces relatively small pellets having a relatively uniform size distribution with the major amount of pellets being in the 6 mm. to 8 mm. diameter range.

TABLE 1

| | |
|---|---|
| Graphite (lbs.) | 8 |
| N330 Carbon Black (lbs.) | 0.4 |
| Pelleting Liquid (lbs.) | 3.80 |
| Water (wt. %) | 97.11 |
| Calcium Lignin Sulfonate (wt. %) | 2.89 |
| Nyclinol (wt. %) | 0 |
| Additional Water (lbs.) | 0 |

TABLE 2

| | |
|---|---|
| Pelleter, RPM, | 450 |
| Pelleting Time, min. | 30 |
| (Pellets were dried at 150° C. to contain about 0.5 wt. % water) | |
| Pellet Analysis, U.S. Standard Sieve, wt. % on sieve or pan: | |
| Greater than 10 mesh, wt. %, | 94.2 |
| Less than 10 mesh, wt. %, | 5.8 |
| Held on #5, wt. %, | 63.7 |
| Held on #10, wt. %, | 30.5 |
| Held on #12, wt. %, | 1.7 |
| Held on #14, wt. %, | 0.8 |
| Held on #18, wt. %, | 0.2 |
| Held on #35, wt. %, | 0.3 |
| Held on #60, wt. %, | 0.2 |
| Held on #120, wt. %, | 0.3 |
| Held on Pan, wt. %, | 2.3 |
| Average Hardness (force in grams) | 68 |
| Low Value (force in grams) | 46 |
| High Value (force in grams) | 98 |
| Wt. % Carbon Black (Based on Graphite) | 5.0 |

This example was conducted using the method of Example IV above and under the above set forth conditions using about 5 weight percent carbon black (based on graphite). Hardness tests show that the pellets will "stand up" during shipment. The pellets were in the "pea-size", commercially desirable size, 6 mm. to 8 mm. in diameter, with relatively narrow uniform size distribution, and had satisfactory hardness.

EXAMPLE VI

TABLE 1

| | |
|---|---|
| Graphite (lbs.) | 8 |
| N330 Carbon Black (lbs.) | 0.8 |
| Pelleting Liquid (lbs.) | 3.604 |

TABLE 1-continued

| | |
|---|---|
| Water (wt. %) | 93.79 |
| Calcium Lignin Sulfonate (wt. %) | 6.10 |
| Nyclinol (wt. %) | 0.11 |
| Additional Water (lbs.) | 0 |

TABLE 2

| | Run 1 | Run 2 |
|---|---|---|
| Pelleter, RPM, | 100 | 450 |
| Pelleting Time, min. | 50 | 50 |
| (Pellets were dried at 150° C. to contain about 0.5 wt. % water) | | |
| Pellet Analysis, U.S. Standard Sieve, wt. % on sieve or pan: | (15-25 mm., not sieved) | |
| Greater than 10 mesh, wt. %, | | 92.4 |
| Less than 10 mesh, wt. %, | | 7.6 |
| Held on #5, wt. %., | | 44.6 |
| Held on #10, wt. %, | | 44.7 |
| Held on #12, wt. %, | | (Screen omitted) |
| Held on #14, wt. %, | | (Screen omitted) |
| Held on #18, wt. %, | | 6.2 |
| Held on #35, wt. %, | | 0.5 |
| Held on #60, wt. %, | | 0.2 |
| Held on #120, wt. %, | | 0.1 |
| Held on Pan, wt. %, | | 0.7 |
| Average Hardness (force in grams) | | 174 |
| Low Value (force in grams) | | 77 |
| High Value (force in grams) | | 250+ |
| Wt. % Carbon Black (Based on Graphite) | 10.0 | 10.0 |

In the runs of Example VI, both calcium lignin sulfonate and Nyclinol, both conventional pelleting additives, were used, and 10 weight percent carbon black (based on the graphite) was used in each run. Nyclinol is a hydrocarbon boiling in the range of about 200° F. to 400° F., containing about 40 volume percent aromatics, the remainder being mainly paraffinics and naphthenics. The amount of calcium lignin sulfonate used was about twice that used in Examples II, III, IV and V. Example VI used about 5 weight percent calcium lignin sulfonate (based on graphite).

In Run 1 at 100 RPM, the produced pellets were 15 mm. to 25 mm. in diameter.

In Run 2 at 450 RPM, no pellets were larger than 9 mm. diameter and most of the pellets were about 4 mm. diameter. The pellets were relatively hard and the range in hardness between low and high values was from 77 grams to 250+ grams.

Example VI is further discussed below with reference to Example VII.

EXAMPLE VII

TABLE 1

| | |
|---|---|
| Graphite (lbs.) | 8 |
| N330 Carbon Black (lbs.) | 0 |
| Pelleting Liquid (lbs.) | 4.004 |
| Water (wt. %) | 94.41 |
| Calcium Lignin Sulfonate (wt. %) | 5.49 |
| Nyclinol (wt. %) | 0.10 |
| Additional Water (lbs.) | 0 |

TABLE 2

| | Run 1 | Run 2 | Run 3 |
|---|---|---|---|
| Pelleter, RPM, | 100 | 450 | 100 |
| Pelleting Time, min. | 40 | 40 | 40 |
| (Pellets were dried at 150° C. to contain about 0.5 wt. % water) | | | |
| Pellet Analysis, U.S. Standard Sieve, wt. % on sieve or pan: | (15-25 mm., not sieved) | ("Mud", not sieved) | |
| Greater than 10 mesh, wt. % | | | 64.7 |
| Less than 10 mesh, wt. % | | | 30.8 |
| Held on #5, wt. %, | | | 42.8 |
| Held on #10, wt. %, | | | 21.9 |
| Held on #12, wt. %, | | | 4.9 |
| Held on #14, wt. %, | | | 6.9 |
| Held on #18, wt. %, | | | 9.3 |
| Held on #35, wt. %, | | | 4.9 |
| Held on #60, wt. %, | | | 1.5 |
| Held on #120, wt. %, | | | 0.7 |
| Held on Pan, wt. %, | | | 2.6 |
| Average Hardness (force in grams) | | | 37 |
| Low Value (force in grams) | | | 23 |
| High Value (force in grams) | | | 47 |
| Wt. % Carbon Black (Based on Graphite) | 0 | 0 | 0 |

Example VII used no carbon black and used calcium lignin sulfonate and Nyclinol in the pelleting solution. Calcium lignin sulfonate was about 5 weight percent (based on graphite) and in the amount the same as in Example VI.

Run 1 was at 100 RPM; then this mass was run as Run 2 at 450 RPM; then the same mass was run as Run 3 at 100 RPM.

At 100 RPM in Run 1, the pellets were 15 mm. to 25 mm. diameter.

At 450 RPM in Run 2, "mud" was made.

At 100 RPM in Run 3, the pellets were less than 9 mm. diameter with a large amount of very small pellets being produced. (The sieve analysis totals 95.5 weight percent out of 100 weight percent.) The pellets were relatively soft, however the range of values of hardness is relatively narrow.

Examples VI and VII show the effect of the presence or absence of added carbon black at higher levels of calcium lignosulfonate and in the presence of small amounts of Nyclinol. At 100 RPM, both in the presence and absence of carbon black, pellets having a size distribution of 15 mm to 25 mm were formed. At 450 RPM in the presence of carbon black (Example VI), no pellets greater than 9 mm. diameter were formed and the majority were about 4 mm. By contrast, in the absence of carbon black at 450 RPM (Example VII), only mud was formed.

Example VII when compared with Example VI also shows that it is possible to make satisfactorily sized pellets of graphite without added carbon black at high levels of calcium lignosulfonate after a complex treatment sequence compared to that required when carbon black is present.

Graphite and carbon black pellets produced according to the instant invention can be used, for example, in the following industrial processes: adhesive retardant to anode collector bar applied in the form of a spray or wash; recarbonization ladle and furnace additive; trough blacking, for example, as a cupola primary slagging agents, and for carbonization of steel. Other uses and advantages will also be apparent to persons skilled in the art.

It is to be understood that while there has been described and illustrated preferred embodiment of certain aspects of the invention, the invention is not limited to the specific aspects herein described and shown except to the extent that such limitations are found in the claims.

What is claimed and sought to be secured by Letters Patent is:

1. A process for forming composite graphite and carbon black pellets comprising:
   mixing a graphite with carbon black to form a first mixture comprising carbon black in the range of 2 percent to 50 percent by weight of graphite;
   mixing a pelleting liquid with said first mixture to form a second mixture;
   pelleting said second mixture in a pin pelleter to form wet pellets; and
   drying the wet pellets.
2. A process as in claim 1 wherein:
   said first mixture comprises carbon black in the range of 2 percent to 10 percent by weight of graphite.
3. A process as in claim 1 wherein:
   said first mixture comprises carbon black in the range of 4 percent to 6 percent by weight of graphite.
4. A process as in claim 1 wherein:
   said pelleting liquid is a liquid selected from the group consisting of aqueous solutions of solutes of calcium lignin sulfonate, sodium lignin sulfonate, ammonium lignin sulfonate and molasses.
5. A process as in claim 4 wherein:
   said aqueous solutions comprise said solute in the range of about 0.5 percent to about 10 percent by weight of the pelleting liquid.
6. A process as in claim 5 wherein:
   said pelleting liquid has a ratio by weight to said first mixture in the range of about 25:75 to about 40:60.
7. A process as in claim 6 wherein:
   said ratio is in the range from approximately 30:70 to about 35:65.
8. A process as in claim 6 wherein:
   said dry powdered graphite has the following characteristics:

| | |
|---|---|
| Graphitic Free Carbon, wt. % | 87 |
| Silicon Dioxide, wt. % | 5 |
| Residual Oxide, wt. %., | 8 |
| Sulfur, wt, %., | 0.21 |
| Volatile Matter, wt. %., | 1.71 |
| CTAB, $M^2$/gm., | 16 |
| DBP, cc/100 gm., | 65 |
| $N_2SA$, $M^2$gm., | 11 |
| Iodine Adsorption, mgm/gm., | 24 |
| U.S. Standard Sieve | |
| Held on 35 mesh, wt. %., | 1.8 |
| Held on 65 mesh, wt. %., | 20.6 |
| Held on 100 mesh, wt. %., | 16.2 |
| Held on 150 mesh, wt. %., | 16.6 |
| Held on 200 mesh, wt. %., | 14.2 |
| Held on 325 mesh, wt. %., | 14.0 |
| Held on the pan, wt. %., | 16.6 |
| Bulk Density, lbs/cu. ft., | 49.54 | and the carbon black used is flocculent or loose N330 Carbon Black.

9. A process as in claim 7 wherein:
   said carbon black has the following characteristics:

| | (ASTM) |
|---|---|
| $N_2SA$, $M^2$/gm, | 85 |
| CTAB $M^2$/gm, | 82 |
| $I_2No$, mg/gm, | 87 |
| 24M4DBP, cc/100 | 96 |
| Tint Strength, | 96 |
| Photelometer, | 71 |

* * * * *